Sept. 30, 1969   J. E. TURRIERE   3,470,464

SYSTEM FOR MEASURING ELAPSED TIME

Filed Nov. 25, 1966   3 Sheets-Sheet 1

Inventor
JEAN E. TURRIERE
By Leonard Holtz
Agent

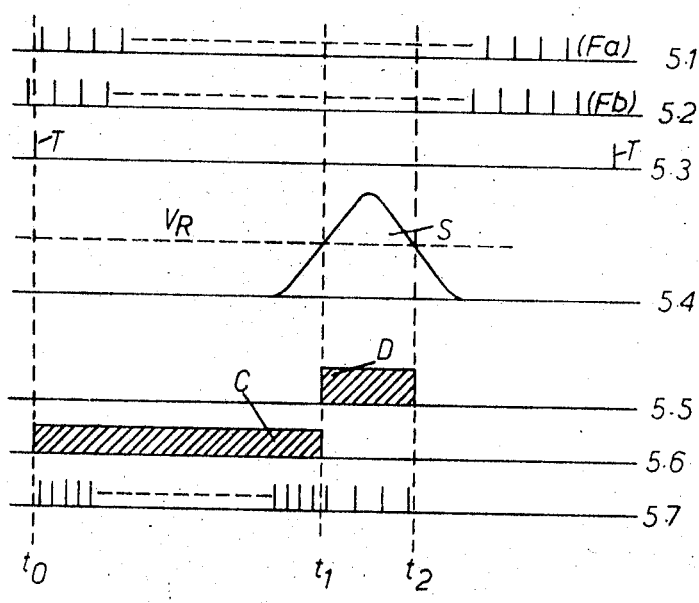

United States Patent Office 3,470,464
Patented Sept. 30, 1969

3,470,464
SYSTEM FOR MEASURING ELAPSED TIME
Jean Emile Turriere, Paris, France, assignor to International Standard Electric Corporation, New York, N.Y., a corporation of Delaware
Filed Nov. 25, 1966, Ser. No. 597,101
Claims priority, application France, Dec. 1, 1965, 40,521
Int. Cl. H05k 5/20
U.S. Cl. 324—68        12 Claims

ABSTRACT OF THE DISCLOSURE

A reference pulse causes at a frequency 2F to be coupled, via gates, to a counter until the arrival of a signal pulse. The signal pulse, during its presence causes pulses at a frequency F to be coupled via said gates to said counter. The final count of the counter is a measure of the time from the occurrence of the reference pulse to the center of the received signal pulse.

---

This invention relates to pulse position measuring systems and more particularly to a system for measuring the elapsed time between a time reference signal and a predetermined porportion of the width of an input pulse signal.

In many radar systems and the like it is desirable to measure the time position of the received pulse relative to a time reference signal. The prior art systems have performed this measurement in the following manner. Letting $t_0$ designate the time reference and $t_1$ and $t_2$ the time positions of the leading and trailing edges, respectives, of the input pulse whose time position is to be measured, the time measurement is usually carried out as follows:

(a) Counting the number $n_1$ of clock signals delivered by a clock pulse generator between the times $t_0$ and $t_1$;

(b) Counting the number $n_2$ of clock signals delivered by said clock pulse generator between the times $t_1$ and $t_2$; and (c) Carrying out the operation $N = n_1 + n_2/2$, the number N being proportional to value $t = t_0 + (t_2 - t_1)/2$, this time value $t$ being proportional to the elapsed time between the reference signal at $t_0$ and the center of the input pulse.

It is seen that this system requires the use of two separate counters (one to count the $n_1$ pulses and the other to count the $n_2$ pulses) and an addition circuit, the division by two of the number $n_2$ being made very simply if the corresponding counter operates in the binary code, which normally is the case.

The main object of this invention is to provide a simplified and improved pulse position measuring system for measuring the elapsed time between a time reference signal and a predetermined proportion of the width of an input pulse signal.

A feature of this invention is that only one counting circuit is required and there is no requirement for an addition circuit.

According to this invention, the measurement of the elapsed time between a time reference signal and a predetermined proportion of the width of an input pulse signal is made by counting the number of pulses from a first source of clock frequency pulses generated between the occurrence of the reference signal ($t_0$) and the occurrence of the leading edge of the input pulse ($t_1$). Upon receiving the leading edge of the input pulse a second source of clock frequency pulses is switched to the counter, the counter counting these second clock frequencies during the time interval that the signal pulse is present ($t_2 - t_1$). The final state of the counter is proportional to the elapsed time between the time reference signal and a predetermined proportion of the width of the input pulse signal. If the two clock frequency sources have a frequency ratio of two-to-one then, the final output of the counter will be proportional to the time interval between the reference signal and the center of the input pulse signal.

It is seen that this system provides a considerably simpler pulse position measuring system without reducing the accuracy of the measurement. It may be used in all cases where the width of the signal is sufficiently large with respect to the smallest of the two values of the period of the clock frequency pulses. Thus, for input pulse frequencies in the tens of megahertz range, the circuit may be used in surviellance radars, in radio navigation systems, in long distance localization systems and in horizon and sun sensors. For input pulse frequencies of several hundreds of megahertz, the circuit may be used in radio altimeters and in high accuracy tracking radars wherein the signals to be measured have durations of a few hundred nanoseconds.

The above-mentioned and other features and objects of this invention will become apparent by reference to the following description taken in conjunction with the accompanying drawings in which:

FIGURE 5 represents the diagrams of the signals which are present in several points of the circuit of FIGURE 4.

Before describing the invention, we shall briefly discuss the logical algebra notations which will be used herein in order to simplify the writing in the description of the logical operations. The subject is treated extensively in numerous papers and in particular in the book "Logical Design of Digital Computers" by M. Phister (J. Wiley, publisher).

Thus, if a condition characterized by the presence of a signal is written A, the condition characterized by the absence of said signal will be written $\bar{A}$.

These two conditions are linked by the well known logical relation $A \times \bar{A} = 0$, which the sign $\times$ is the symbol of the coincidence logical function or "AND" function.

If a condition C appears only if the conditions A and B are simultaneously present, one writes $A \times B = C$ and this function may be carried out by means of a coincidence or AND circuit.

If a condition C appears when at least one of two conditions E and F is present, one writes $E + F = C$ and this function is carried out by means of a mixing or OR circuit.

Since these AND and OR logical functions are commutative, associative and distributive, one may write:

$A + B = B + A$;
$A \times (B + C) = A \times B + A \times C$;
$(A+B)(C+D) = A \times C + A \times D + B \times C + B \times D$; etc.

Figure 1:
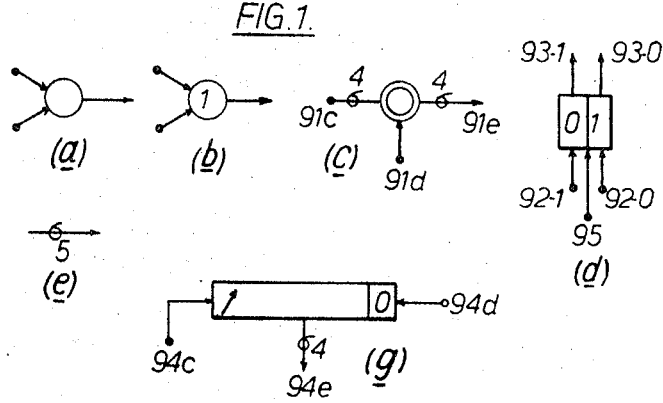
FIGURE 1 represents the symbols used in the diagrams of the FIGURES 2 and 4.

One will also specify, in relation with the FIGURE 1, the meaning of some particular symbols used in the drawings which come with the description of the invention. Thus:

FIGURE 1a represents a simple AND circuit;
FIGURE 1b represents a simple OR circuit;
FIGURE 1c represents a multiple AND circuit, which comprises in the case of the example, four AND circuits, having each a first input terminal connected to each one of the conductors 91c and a second input terminal connected to a common conductor 91d;

FIGURE 1d represents a bistable circuit or "flip-flop" to which a control signal is applied over one of its input terminals 92–1 or 92–0 in order to set it in the 1 state or to reset it in the 0 state. A voltage of same polarity as that of the control signal is present, either on the output 93–1 when the flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{B1}$. The same symbol represents also a scale-of-two circuit of the Eccles-Jordan type which divides by two the frequency of the signals applied on its input terminal 95;

FIGURE 1e represents a group of several conductors, five in the considered example;

FIGURE 1g represents a flip-flop counter which counts the pulses applied to its input terminal 94c and which is cleared by the application of a signal on its input 94d. The 1 outputs of the flip-flops are connected to the output conductors 94e.

Figure 2:
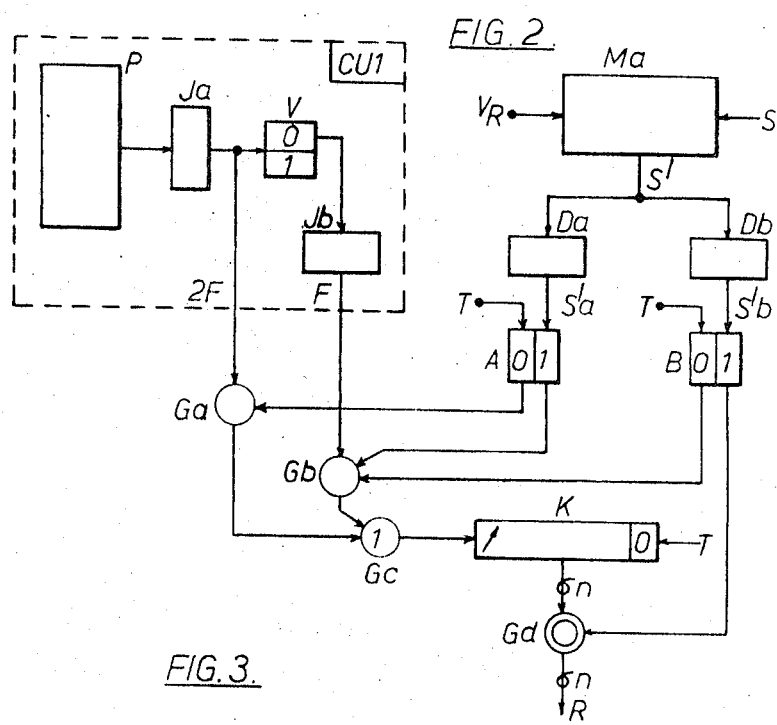
FIGURE 2 represents the detailed diagram of a first mode of achievement of the invention.

In the first mode of achievement of the invention (FIGURE 2), the counting pulses are supplied by the clock CU1 which comprises the signal generator P supplying signals of frequency 2F represented on the diagram 3.1; the shaping circuits Ja, Jb which transform these signals into pulses of low duty factor and the flip-flop V which operates as a scale-of-two. It results therefrom that the circuit Jb delivers the signals represented on the diagram 3.2 the frequency F of which is equal to half of the frequency of the signals supplied by the circuit Ja.

The signal T represented on the diagram 3.3 constitutes the reference time position with respect to which the time position measurement of the signal S shown on the diagram 3.4 is carried out.

This signal S is applied to the amplitude comparator Ma which delivers a signal S' (diagram 3.5) when its amplitude is higher than a reference voltage VR, this signal having a duration $t_2-t_1$ shorter than that of the former signal and having steeper edges.

This signal S' is applied to the differentiating circuits Da and Db which are made in such a way as to deliver positive pulses S'a and S'b corresponding respectively to the leading and to the trailing edges of the signal, as represented on the diagram 3.6, these pulses being applied to the flip-flops A and B.

The conditions A, $\overline{A}$, $\overline{B}$ as well as the signals of frequency 2F and F supplied by the clock CU1 control the opening of the AND circuits Ga and Gb which deliver, through the OR circuit Gc, advance signals to the counter K which comprises n flip-flops in the case where it operates in natural binary code or in reflected binary code.

On the other hand, the condition B controls the opening of the AND multiple circuit Gd which delivers, over the group of n conductors R, the binary number which characterizes the time position of the signal S with respect to that of the signal T.

When a start signal T is applied to the circuit at time $t_0$, the counter K and the flip-flops A, B are reset to zero, so that the logical condition $\overline{A} \times \overline{B}$ is established. The AND circuit Ga is then energized and the counter K receives advance pulses at the frequency 2F.

When the pulse S'a (diagram 3.6) appears at time $t_1$, the flip-flop A sets to the 1 state and the logical condition: $A \times \overline{B}$ is established, and controls the blocking of the AND circuit Ga and the energizing of the AND circuit Gb. The counter K receives then pulses at the frequency F.

At time $t_2$, which characterizes the end of the signal S', the pulse S'b (diagram 3.6) controls the setting of the flip-flop B in the 1 state and the logical condition $A \times B$ is established characterizing the fact that the measurement is completed and that the number stored in the counter K may be used.

The AND circuits Ga and Gb are blocked and the AND multiple circuit Gd is activated enabling the transmission of this number towards the utilization circuits.

The next signal T controls the return to the condition $\overline{A} \times \overline{B}$.

The three logical conditions used in this circuit are the conditions $\overline{A} \times \overline{B}$, $A \times \overline{B}$, $A \times B$ and it will be noted that each one of the terms $\overline{A}$ and B appears only once, this enabling to control the AND circuits Ga and Gb only through respectively the conditions $\overline{A}$ and B.

The diagram 3.9 represents the advance pulses received by the counter during the time interval $t_0-t_2$. It is seen that the fact of reducing by half the number of pulses counted during the time interval $t_1-t_2$ enables the measurement of the time interval $t_0-t_3$ by means of one single counter and without carrying out an addition operation.

Figure 4:
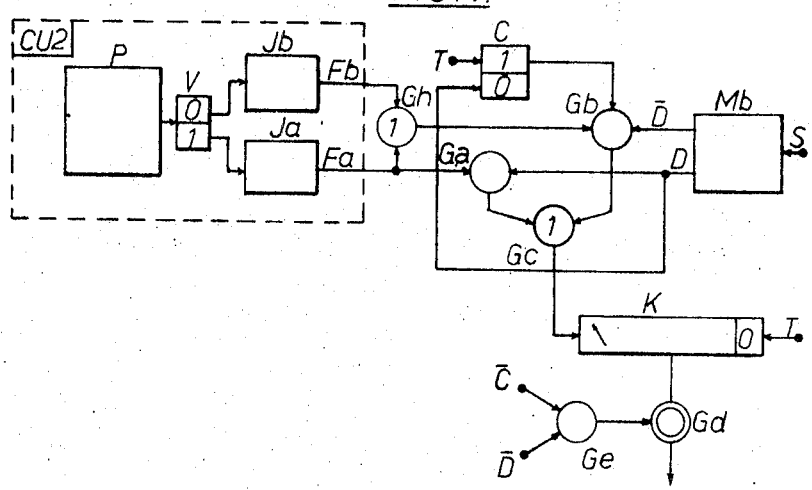
FIGURE 4 represents the detailed diagrams of a second mode of achievement of the invention.

If one examines now the FIGURE 4 which represents the diagram of a second mode of achievement of the invention, it is seen that the clock CU2 comprises the same elements as the clock CU1 but that said elements are connected in a slightly different way. Advance pulses Fa and Fb of frequency F are thus obtained from the outputs 0 and 1 of the flip-flop V and constitute thus two trains of signals which are in phase opposition as it appears on diagrams 5.1 and 5.2 of FIGURE 5.

The diagrams 5.3 and 5.4 represent respectively the start signal T and the signal to be measured S. The determination of the leading and trailing edges of this latter signal is carried out through a triggering circuit Mb such as a "Schmitt trigger" adjusted in such a way as to deliver a rectangular signal D (see diagram 5.5) as long as the amplitude of the signal S is higher than the reference voltage VR for which the circuit is set, and a signal $\overline{D}$ of same polarity in the opposite case. Triggering circuits which present practically no hysteresis at all, are well known and by way of example, the one described in the February 1965 issue of the review "Solid State Design," page 29 (article entitled "A Transistorized Level Detector" by B. Murari) will be cited.

Figure 3:
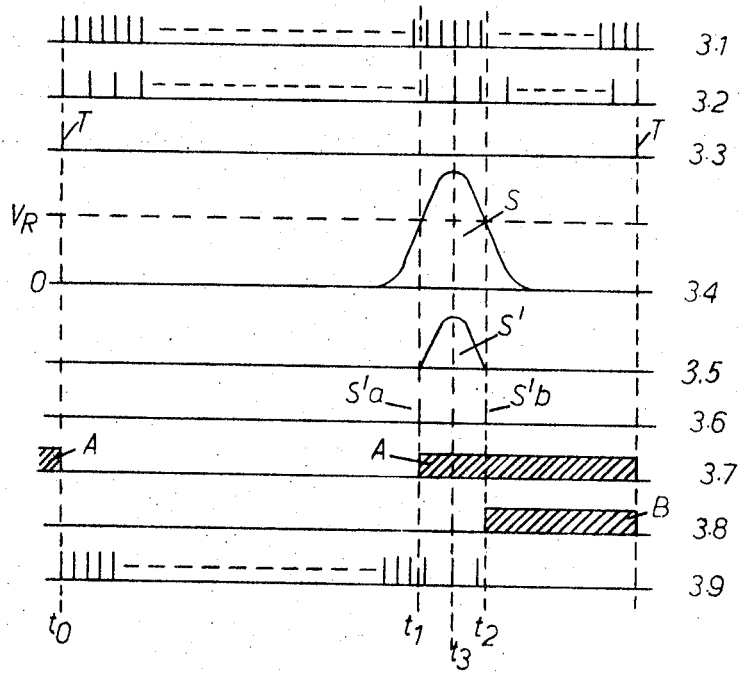
FIGURE 3 represents the diagrams of the signals which are present in several points of the circuit of FIGURE 2.

When a start signal T is applied to the circuit at time $t_0$, the counter K—identical to that described in relation with FIGURE 3—is cleared and the flip-flop C is set to the 1 state delivering a signal represented on the diagram 5.6.

The logical condition $C \times \overline{D}$ is present up to the time $t_1$ and the counter K receives alternatively the signals Fa and Fb through the electronic gates Gh, Gb and Gc and it advances at the frequency 2F as shown on the diagram 5.7.

At the time $t_1$, the trigger Mb supplies a signal D which controls the blocking of the AND circuit Gb, the energizing of the AND circuit Ga and the resetting to the 0 state of the flip-flop C.

The counter K receives then only the signals Fa and thus counts at half the former rate up to the signal D (time $t_2$) which controls the blacking of the AND circuit Ga.

From the time $t_2$ on, the condition $\overline{C} \times \overline{D}$ is present and the AND multiple circuit Gd is energized enabling the transmission of the number stored in the counter K towards the utilization circuits.

As in all pulse counting circuits, the measurement accuracy is mainly limited by the switching time of the state of the flip-flops. Nevertheless, the error is constant in absolute value and may be made negligible if said switching time is small with respect to the period of the counted signals.

It will be noted that in the described circuits, the beginning and the end of the two counting operations are defined by switchings of flip-flops or of triggers, which introduces a constant delay in the execution of these operations. This results in a theoretical error but note that there is no measurement error if the switching times are small with respect to the period of the counted signals.

While the principles of the above invention have been described in connection with specific embodiments and particular modifications thereof, it is to be clearly understood that this description is made by way of example and not as a limitation of the scope of the invention.

I claim:

1. A system for measuring the elapsed time between a given time reference signal and a predetermined proportion of the width of an input pulse signal comprising:
   a source of a time reference signal;
   a source of an input pulse signal;
   a first clock frequency signal source including first means for generating a first signal having a first frequency;
   a second clock frequency signal source including second means for generating a second signal interleaved in time with said first signal;
   means for selectively combining said first and second signals;
   a counter;
   means for feeding a selected one of said clock frequency signals to said counter responsive to said time reference signal; and
   means for selectively feeding the other of said clock frequency signals to said counter responsive to said input pulse signal, the final state of said counter being proportional to the elapsed time between said time reference signal and a predetermined proportion of the width of said input pulse signal.

2. A system according to claim 1 wherein said first and second frequencies are equal, the final state of said counter being substantially proportional to the elapsed time between said time reference signal and the center of said input pulse signal.

3. A system according to claim 1 wherein said second clock frequency signal sources includes:
   a multivibrator coupled to the output of said first generating means; and
   a first OR gate coupled to the outputs of said multivibrator.

4. A system according to claim 3 wherein said means for feeding said clock frequency signals to said counter includes:
   a second multivibrator, one input thereof being coupled to the source of time reference signal;
   a first AND gate coupled to said second multivibrator, to the output of said first OR gate and to said source of input pulse signal;
   a second AND gate coupled to a first output of said first multivibrator and to said source of input pulse signal;
   a second OR gate coupled to said first and second AND gates, the output of said second OR gate being coupled to said counter;
   means coupling said source of input pulse signal to said second multivibrator;
   a third AND gate coupled to said source of input pulse signal and to said second multivibrator; and
   output means coupled to said counter and to said third AND gate for providing an output signal proportional to the elapsed time between said time reference signal and a predetermined proportion of the width of said input pulse signal.

5. A system according to claim 4 wherein said source of input pulse signal includes means for providing complimentary outputs responsive to said input pulse signal.

6. A system according to claim 4 wherein said source of time reference signal is further coupled to said counter for resetting said counter.

7. A system for measuring the elapsed time between a given time reference signal and a predetermined pulse of the width of an input pulse signal comprising:
   a source of a time reference signal;
   a source of an input pulse signal;
   a first clock frequency signal source;
   a second clock frequency signal source;
   a counter;
   first and second multivibrators coupled to said source of time reference signal and to said source of input pulse signal;
   a first AND gate coupled to said first source of clock frequency signal and to a first output of said first multivibrator;
   a second AND gate coupled to the output of said second source of clock frequency signals, to the second output of said first multivibrator and to the first output of said second multivibrator;
   a first OR gate coupled to the outputs of said first and second AND gates, the output of said first OR gate being coupled to the input of said counter;
   output means coupled to the second input of said second multivibrator and to the output of said counter for providing a signal proportional to the elapsed time between said time reference signal and a predetermined proportion of the width of said input pulse signal.

8. A system according to claim 7 wherein said first clock frequency signal is twice the frequency of said second clock frequency signal, the final state of said counter being substantially proportional to the elapsed time between said time reference signal and the center of said input pulse signal.

9. A system according to claim 7 further comprising a pulse shaper coupled between said source of input pulse signal and said first and second differentiators.

10. A system according to claim 7 wherein said first and second clock frequency signal sources include:
    a pulse generator providing a signal output having a first frequency; and
    a multivibrator coupled to the ouput of said generator, the output of said generator comprising said first clock frequency signal and the output from said multivibrator comprising said second clock frequency signal.

11. A system according to claim 10 further comprising:
    a first differentiator coupled to said source of input pulse signal for coupling a pulse to said first multivibrator responsive to the leading edge of said input pulse signal; and
    a second differentiator coupled to said source of input pulse signal for coupling a pulse to said second multivibrator responsive to the trailing edge of said input pulse signal.

12. A system according to claim 10 further including means coupling said source of time reference signal to said counter for resetting said counter.

References Cited

UNITED STATES PATENTS 2,806,205  9/1957  Donath.

RUDOLPH V. ROLINEC, Primary Examiner

P. F. WILLE, Assistant Examiner

U.S. Cl. X.R.

328—108